Aug. 7, 1962 J. M. SLATER ETAL 3,048,043
GAS BEARING GYROSCOPE
Filed Sept. 1, 1954 2 Sheets-Sheet 1

INVENTORS.
JOHN M. SLATER
BY JOSEPH S. ACTERMAN
William R. Lane
ATTORNEY

Aug. 7, 1962    J. M. SLATER ETAL    3,048,043
GAS BEARING GYROSCOPE
Filed Sept. 1, 1954    2 Sheets-Sheet 2

INVENTORS.
JOHN M. SLATER
JOSEPH S. ACTERMAN
BY
William R. Lane
ATTORNEY

United States Patent Office 3,048,043
Patented Aug. 7, 1962

3,048,043
GAS BEARING GYROSCOPE
John M. Slater, Fullerton, and Joseph S. Acterman, Long Beach, Calif., assignors to North American Aviation, Inc.
Filed Sept. 1, 1954, Ser. No. 453,566
4 Claims. (Cl. 74—5)

This invention relates to a gyroscope having gas autolubricated radial and thrust bearings, and to the combination of such bearings for use in other precision instruments.

Provision of a really satisfactory bearing for the rotors of a navigation gyroscope is a serious problem. The principal requirements for rotor bearings in navigation gyroscopes are freedom from vibration and constancy of elastic properties. Lower power consumption, simplicity and low cost are important secondary requirements. Ball bearings are the only type which, so far, have been generally used in gyro rotor support. However, their behavior, even when the utmost skill is applied to their fabrication and installation, leaves much to be desired. Their principal defects are vibration, insufficient rigidity, and high friction loss.

This invention eliminates the above difficulties in gyroscopes by providing a combination of an autolubricated radial spin gas bearing formed between the shaft and the gyroscope rotor and two gas autolubricated thrust surfaces at or near the vicinity of each of the radial bearing extremities and at right angles to its surfaces. The term "autolubricated" means self-lubricating in the atmosphere or in other gases of pressure higher than one half cm. of Hg. The radial bearing action between the smooth hard surfaces of the shaft and rotor is created by rotation of the rotor with the supporting pressure of the gas which is generated when the gas is dragged into the gap upon development of a tapered gap on radial displacement of the motor under load. One of the thrust bearing surfaces is smooth, and the opposing face has a number of inclined wedges which are normally separated from each other by a plane surface, as shown in FIG. 4. The wedges may be either on the thrusting surface or the surface receiving the thrust. By reason of the configuration of the latter thrust bearing surface, the gas lubricated bearing develops a supporting force for the shaft associated therewith. In both type bearings, the production of this supporting lift depends primarily on the viscosity of the gas.

An alternate form of this invention is the combination of radial and thrust bearing surfaces on the face of a hemisphere or on a rounded face that is similar to a hemisphere. The autolubricated gas radial and thrust bearing action occurs between the concave and covex surfaces illustrated in FIGS. 5 and 6. The concave and convex bearing surfaces are positioned concentric to each other and adapted for relative rotation in a gyroscope in the same general location as the "right angle" bearing surfaces described above. Similar to the first-mentioned thrust bearing surfaces described above, one of the spherical thrust bearing surfaces is smooth and the opposing face has a number of inclined wedges which are normally separated from each other by a true spherical or spheroidal surface, as illustrated in FIG. 6. Also as above, the wedges may be either on the thrusting surface or on the surface receiving the thrust and the supporting force is developed by reason of this configuration. As the spherical type bearing affords full radial support, there is no need for a cylindrical radial bearing in combination with the spherical bearing. However, a cylindrical radial bearing may be used in combination with the spherical bearing on the same shaft.

The advantages of this combination of bearings over ball bearings in a gyroscope are: (1) it produces no vibration; (2) it has extreme rigidity and no mechanical hysteresis; (3) it reduces the power consumption from 10 or more watts, as required with ball bearings, to 3 or 4 watts at moderate speeds; (4) it makes high speeds possible with a minimum of deflection and without detracting from long-life; and (5) its simple construction reduces the cost of manufacture.

It is therefore an object of this invention to provide an improved gyroscope.

A further object of this invention is to provide a gyroscope which is free from vibration.

Another object of this invention is to provide a high speed gyroscope with extremely rigid construction to minimize deflection of the rotor and/or gimbal under acceleration.

Another object of this invention is to provide a combination of thrust and radial bearings with a constancy of elastic properties which allow for extreme rigidity and resulting negligible deflection under load.

Another object of this invention is to provide a gyroscope having a combination of radial and thrust bearings with freedom from mechanical hysteresis.

Another object of this invention is to provide a combination of radial and thrust bearings that will reduce power consumption, thereby minimizing heating, and allow for operation from an electronic supply rather than a cumbersome frequency-controlled inverter.

Another object of this invention is to provide a combination of radial and thrust bearings for gyroscopes and other precision instruments that is economical in construction and that allows for simple but precise fabrication.

Another object of this invention is to provide a combination of gas autolubricated radial and thrust bearings that will function at gas pressures as low as ½ cm. Hg before any deterioration of performance can be noted and, therefore, can be operated in partial vacuum to further reduce power requirements.

Another object of this invention is to provide a combination of radial and thrust bearings that are self-lubricating in gases at pressures as low as ½ cm. Hg.

Another object of this invention is to provide a combination of radial and thrust bearings with a lubricant that is insensitive to increases in bearing temperature.

Another object of this invention is to provide a combination of radial and thrust bearings in which there is no mechanical wear during continuous operation.

Another object of this invention is to provide a combination of radial and thrust bearings in which large bearing surfaces are possible—thus eliminating localized hot spots as occur in ball bearings.

Another object of this invention is to provide a combination of radial and thrust bearings which eliminates grease and the volatiles therefrom in the interior of gyroscopes.

Other objects of invention will become apparent from the following description taken in connection with the accompanying drawings, in which FIG. 1 is a cross section of a gyroscope;

Figure 6:
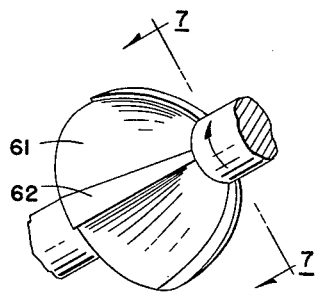
FIG. 6 is an isometric view of spherical type bearing surface having wedge-shaped depressions.
Figure 7:
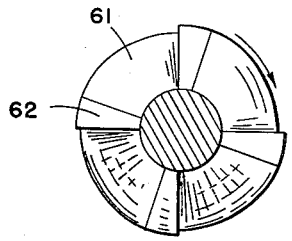

And FIG. 7 is the view taken along the line 7—7 of FIG. 6.

Figure 1:
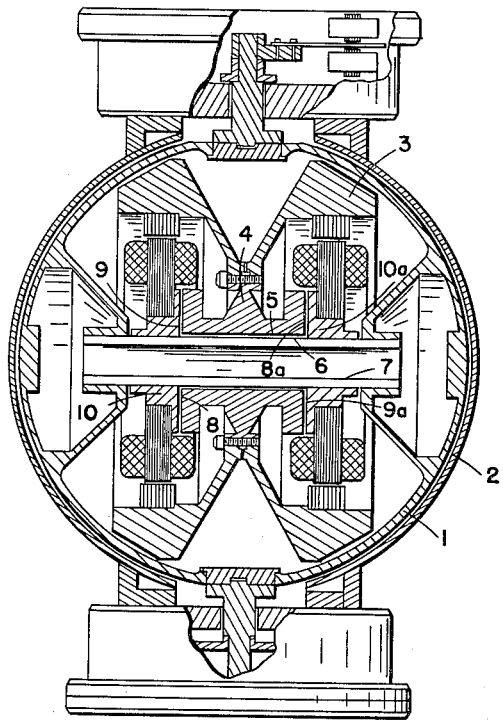

Referring to FIG. 1, a gyroscope with rotor 3 and stator frame 1 is mounted inside an outer housing 2. Rotor 3 is supported by a spool 4 having a radial bearing surface 5 fitted to rotate on the radial bearing surface 6 of shaft 7. Clearance between bearing surfaces 5 and 6 can be 75 to 100 microinches. In this gap, an autolubricated radial spin gas bearing action occurs during operation of the gyroscope. During rotation, thrusting surfaces 8 and 8a on spool 4 are separated by gaps with clearance range being between 100 and 200 microinches from thrust bearing surfaces 9 and 9a, respectively. Bearing surfaces 9 and 9a are on end plates 10 nad 10a, respectively. The autolubricated gas thrust bearing action occurs in the above gaps. The gyroscope of FIG. 1 is limited to moderate speeds but has the advantage of a simplicity of design.

Figure 2A:
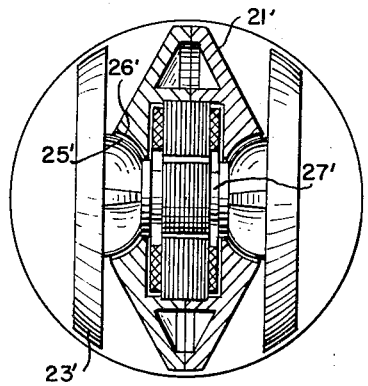
FIGS. 2 and 2a illustrate high speed gyroscopes having a double disc-type rotor, with motor and frame in cross section.
Figure 2:
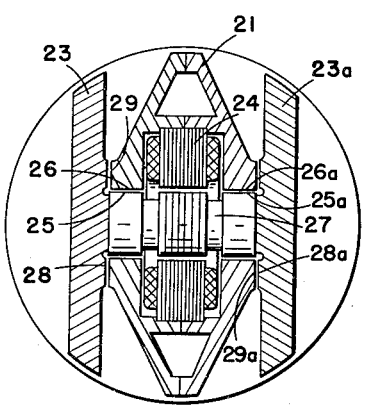
Figure 5:
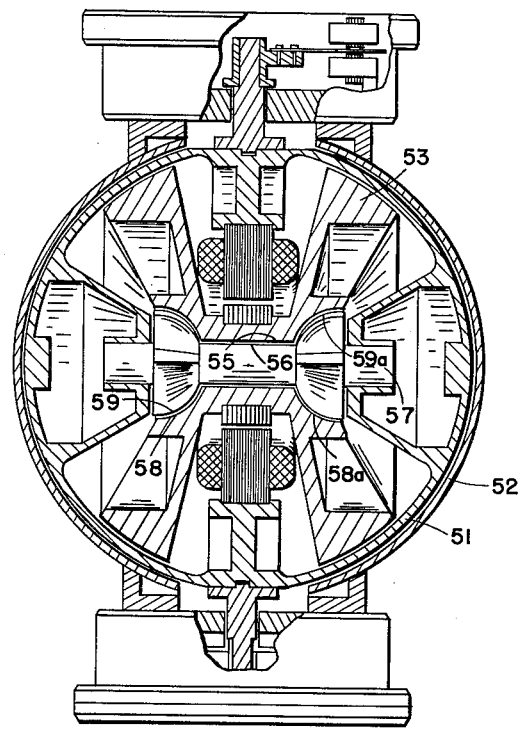
FIG. 5 is a cross section of a gyroscope having a spherical type autolubricated bearing.

FIG. 2 shows a type of gyroscope intended primarily for very high-speed operation; i.e., rotational speeds of the order of 1,000 r.p.s. Rotors 23 and 23a are fixedly mounted on opposite ends of shaft 27 which is disposed axially within motor core 24. Upon each end of shaft 27 are radial bearing surfaces 25 and 25a. Frame 21 provides radial bearing surfaces 26 and 26a and thrust bearing surfaces 29 and 29a. The opposing thrust bearing surfaces 28 and 28a are on the faces of rotors 23 and 23a, respectively. In lieu of the radial and thrust bearings at right angles, as indicated in FIG. 2, the combined spherical type bearing surfaces illustrated in FIGS. 5–7 can be utilized in the double disc-type high speed gyroscope. FIG. 2a illustrates such an arrangement, identical to that of FIG. 2, but utilizing combined spherical type bearing surfaces 25' and 26', the latter being formed on frame 21' and the former being formed on one of the two rotor discs 23' secured to shaft 27'. The bearing surfaces are formed as illustrated in FIGS. 5, 6 and 7.

In the design of a gyrocope to operate at high speeds, relative dimensions, placement of mass and bearing surfaces are some of the factors of importance. A bearing gap may become increased or lessened at high rotor speeds because of large centrifugal forces and Poisson distortions. It is, therefore, necessary to give special consideration to rotor and bearing configuration. For example, rotors of ring configuration do not have the structural rigidity present in those of disc shape, though they may be preferable in some applications because of simplicity of design and fabrication. At 1,000 r.p.i. in the double disc-type gyroscope (FIG. 2), centrifugal force and Poisson distortion tend to descrease the bearing gaps. This, in a gyroscope, is highly dserable because the smaller the gap, the "stiffer" the bearing, which means less deflection of the rotor and/or gimbal under acceleration for a given load. Shaft 27 expands radially at high speeds and the radial bearing gaps are thus decreased. The thrust gaps are lessened also because as shaft 27 expands radially due to centrifugal force, the shaft must shorten longitudinally, thus drawing rotors 23 and 23a inwardly.

Sensitivity and accuracy in a gyroscope are achieved by keeping the ratio of disturbing torque to angular momentum as small as possible. As angular momentum is directly proportional to speed, the operation of a gyroscope at high speeds is thus desirable when the design permits.

However, in gyroscopes having ball bearings, the advantages of operating speeds in excess of 500 r.p.s. are usually outweighed by the complications incident thereto. The effects of rotor distortion are of substantial magnitude and moreover, they increase as the square of the speed. Also, the increased power requirement produces overheating troubles, and the bearing life is reduced. In contrast, using the gas radial spin and thrust bearing combination as developed in this invention, high speeds do not shorten the bearing life. As the speed increases, a higher gas pressure develops in the bearing gap and a stiffer bearing develops. Accordingly, there is a decrease in rotor deflection. Thus, the high speed gyroscope is more accurate.

A gyroscope of the size used in flight instruments (rotor radius around 2.5 to 6 cm.) can be made to run at several times the usual speeds (400 r.p.s.) using the double disc-type rotors as provided in the high speed design here. For the above sizes, the peripheral bursting speed with steel or aluminum-alloy discs is around 800 meters a second which manifests that 1,000 r.p.s. is safe operating speed.

Figure 3:
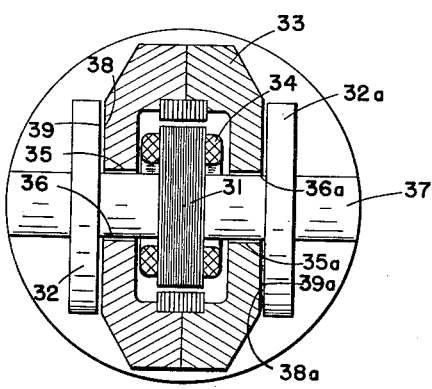
FIG. 3 is a gyroscope in which bearing surfaces are disassociated from the motor with rotor in cross section.

FIG. 3 shows another form of gyroscope in which the rotor is annular in shape and the bearing surfaces are disassociated from the motor. Rotor 33, necessarily constructed in two pieces for assembly, surrounds motor 34. Shaft 37 provides mounting means for motor stator 31 and collars 32 and 32a in conjunction with rotor 33 form thrust bearing surfaces 38, 38a, 39 and 39a. At 35 and 35a, rotor 33 provides radial bearing surfaces, opposing surfaces being on shaft 37 at 36 and 36a. This type of gyroscope is well suited for operation at usual speeds (200 to 400 r.p.s.) and is easy to make and assemble. The combined spherical type bearings can also be employed in this type of gyroscope.

Figure 4:
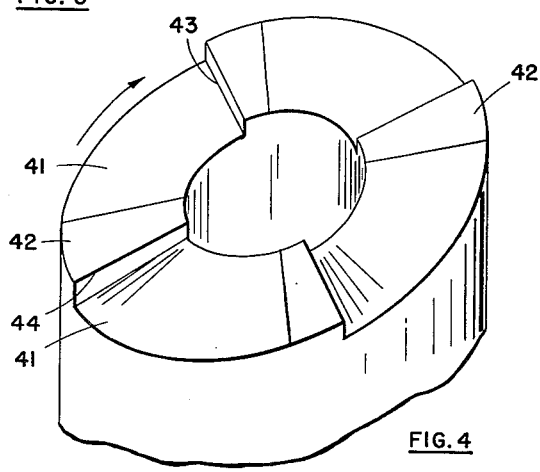
FIG. 4 is an isometric view of a disc having a thrust bearing surface with wedge-shaped depressions.

FIG. 4 illustrates the wedge-shaped thrust bearing surface. It comprises a series of inclined wedges 41 separated by a series of plane portions 42 in which the ratio of the length of the wedges to the length of flat sections is four:one. However, the ratio of the length of the wedges to the length of the flat sections need not be four:one but can be any of a number of different ratios which will produce a good workable bearing. The bearing can also be made without employing the flat surfaces between the wedges. The portions of 41 and 42 may be said to be sectors formed by radial lines such as 43 and 44, extending from the geometric center of the bearing. The inclined sections 41 are preferably in the form of a section in a helix. The helical segments are placed facing the plane surface of the associated plane bearing surface and either the plane surface or the wedge-shaped surface is caused to be rotated. The rotation of one of these parts results in a shearing of the ambient gas between the surfaces at a varying rate. The varying rate of shear results in a net pressure that causes the opposing plane surface and the helical wedge surface to be separated by the gas.

FIG. 5 illustrates a gyroscope of the type shown in FIG. 1. It is different from the gyroscope of FIG. 1 in that it has the combined radial and thrust spherical type bearings. Rotor 53 and stator frame 51 are mounted inside an outer housing 52. Rotor 53 has combined radial and thrust bearing surfaces 58 and 58a fitted to rotate on combined radial and thrust bearing surfaces 59 and 59a, respectively, of shaft 57. A radial bearing surface 55 on rotor 53 may be employed to rotate about a radial bearing surface 56 on shaft 57. However, because spherical type bearings will take the entire radial bearing load, it is not necessary to utilize surfaces 55 and 56 of shaft 57 to form a radial bearing. To form a proper clearance between the spherical bearing surfaces, the radii of the true spheres should differ by about 100 microinches. In this gap combined autolubricated gas radial spin and thrust bearing action occurs during operation of the gyroscope. The gyroscope of FIG. 5 is limited to moderate speeds but has the advantage of a simplicity of design.

FIG. 6 illustrates the spherical type combined radial and thrust bearing with wedge-shaped depressions similar to those shown in FIG. 4. FIG. 7 is the view taken along the lines 7—7 of FIG. 6. It comprises a series of inclined wedges 61 of spherical cross section separated by a series of surfaces 62, the face of which is a part of the circumference of the true sphere or spheroid. The ratio of the arc of the wedges to the arc of the circumferential surfaces can be any one that will produce a good workable bearing. The illustration here shows a ratio of four:one. The bearing can also be made without employing the circumferential surfaces between the wedges. The bearing surface having the wedge-shaped depressions is placed contiguous to the bearing surface having the plain, rounded face so that one of the bearing surfaces surrounds the other. Either the plain, rounded surface or the wedge-shaped surface is caused to be rotated. The rotation of one of the parts, as stated in the description of FIG. 4, results in a shearing of the ambient gas between the surfaces at a varying rate. The varying rate of shear results in a net pressure that causes the opposing surfaces to be separated by the gas.

The materials used in both the radial and thrust bearing surfaces have a hard, smooth finish such as that which may be achieved with chromium or nickel plating.

The use in a gyroscope of the combination of autolubrciated gas radial spin and thrust bearings disclosed herein improves gyroscope operation as compared with those using ball bearings by providing the following: much longer life, higher possible speeds, durability unaffected by temperature, no grease or volatiles in the interior, freedom from vibration and noise, larger bearing surfaces (elimination of localized hot spots as in ball bearings), stiffer bearings with less deflection for a given load, and no mechanical hysteresis, but rather, a return to initial configuration on removal of the load.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A high speed gyroscope comprising a rotor shaft having radial bearing surfaces on the periphery thereof located adjacent to each end of said shaft, symmetrical discs spaced on ends of said shaft exteriorly of said radial bearing surfaces to form an H-shape rotor, said discs having thrust bearing surfaces at right angles and adjacent to said radial bearing surfaces, an annular stator frame surrounding said shaft between said discs and having spaced radial bearing surfaces on the inner periphery thereof and having thrust bearing surfaces on the external faces thereof at right angles to and adjacent to said last-mentioned radial bearing surfaces, said radial bearing surfaces on said rotor shaft and said frame being contiguous so as to form an autolubricated radial gas spin bearing in a gap between said radial surfaces, said thrust bearing surfaces on said rotor discs being contiguous to said thrust bearing surfaces on said external faces of said stator frame to form a thrust bearing on each side of said rotor and said frame, and at least one of said thrust bearing surfaces in each thrust bearing having alternate helically formed wedge-shaped depressions and flat plane surfaces, said depressions tapering in the direction of the rotation of said rotor and providing a gas layer in a gap between each of said contiguous thrust bearing surfaces, in which centrifugal force and Poisson distortion cause the clearances between the contiguous bearing surfaces to decrease at high speeds so as to create stiff bearing operation which substantially reduces the deflection for a given load.

2. A high speed gyroscope comprising a rotor shaft having approximately hemispherical and convex combined radial and thrust bearing surfaces located adjacent to each end thereof, symmetrical discs spaced on ends of said shaft exteriorly of said bearing surfaces to form an H-shape rotor, an annular stator frame surrounding said shaft between said discs and having approximately hemispherical and concave combined radial and thrust bearing surfaces on the inner periphery adjacent to each of the external faces thereof, said combined bearing surfaces on said rotor shaft and said frame being contiguous and concentric so as to form two combined gas autolubricated radial spin and thrust bearings in the gaps between said concentric surfaces, and at least one of said combined bearing surfaces on each bearing having alternate wedge-shaped depressions and true circumferential surfaces providing a gas layer in said gaps, each of said depressions being a surface of a partial spheroid, in which centrifugal force and Poisson distortion cause said gap clearances to decrease at high speeds so as to create stiff bearing operation which substantially reduces the deflection for a given load.

3. In a gyroscope combined radial and thrust bearings, a stator shaft having radial bearing surfaces on the periphery thereof on both sides of a non-bearing surface, thrust bearing surfaces at right angles adjacent to said radial bearing surfaces, said thrust bearing surfaces being on the internal faces of two collars mounted on said shaft at the external ends of said radial bearing surfaces, an annular-shaped rotor surrounding said shaft between said collars and having radial bearing surfaces on both ends of the inner periphery thereof, a non-bearing surface between said last-mentioned radial bearing surfaces, thrust bearing surfaces on the external faces of said rotor at right angles adjacent to said last-mentioned radial bearing surfaces, said rotor being adapted to rotate about said stator shaft, said rotor axis and said stator shaft axis being parallel, said radial bearing surfaces on said stator shaft and rotor at each end being contiguous to each other so as to form an autolubricated radial gas spin bearing in a gap between said radial surfaces, said thrust bearing surfaces on said collars being contiguous to said thrust bearing surfaces on said rotor to form two thrust bearings, and at least one of said thrust bearing surfaces of each bearing having helically formed wedge-shaped depressions with flat plane surfaces uniformly set between said depressions, said depressions tapering in the direction of rotation of said rotor, said depressions and flat surfaces providing an autolubricated gas thrust bearing in a gap between each of said contiguous thrust bearing surfaces.

4. A rigidified gyroscope utilizing Poisson distortion to decrease bearing gaps at high speed comprising a rotor, said rotor including a pair of mutually spaced coaxial disc members and a shaft extending normal to and rigidly interconnecting said members, said shaft being formed with a radial bearing surface thereon, said members being respectively formed with thrust bearing surfaces thereon, a stator journalled on said shaft between said members, said stator being formed with a radial bearing surface in juxtaposed concentric relation with said shaft surface, said stator being further formed with a pair of oppositely disposed thrust bearing surfaces each in juxtaposed concentric relation with a corresponding one of said first mentioned thrust bearing surfaces whereby said surfaces define thrust and radial bearings of said gyroscope, a fluid interposed between the juxtaposed surfaces of said bearings, and means including said bearing surfaces for compressing said fluid in response to rotation of said rotor relative to said stator, whereby Poisson distortion will cause axial contraction and radial expansion of said rotor shaft as it rotates and thereby decrease both the thrust and radial bearing gaps and increase the rigidity of the gyroscope.

References Cited in the file of this patent

UNITED STATES PATENTS

| | | |
|---|---|---|
| 1,544,443 | Gibbs | June 30, 1925 |
| 2,086,896 | Carter | July 13, 1937 |
| 2,582,788 | Mendelsohn | Jan. 15, 1952 |
| 2,597,371 | Perkins et al. | May 20, 1952 |
| 2,627,443 | Becker | Feb. 3, 1953 |
| 2,670,146 | Heizer | Feb. 23, 1954 |
| 2,683,635 | Wilcox | July 13, 1954 |
| 2,696,410 | Topanelian | Dec. 7, 1954 |

OTHER REFERENCES

Air Bearings-Low Friction Lubrication Engineering, by D. D. Fuller, pages 298 to 301, December 1953 (appearing in Lubrication Engineering).

UNITED STATES PATENT OFFICE
CERTIFICATE OF CORRECTION

Patent No. 3,048,043                                  August 7, 1962

John M. Slater et al.

It is hereby certified that error appears in the above numbered patent requiring correction and that the said Letters Patent should read as corrected below.

Column 1, line 38, for "motor" read -- rotor --; line 52, for "covex" read -- convex --; column 3, line 63, for "r.p.i." read -- r.p.s. --; line 66, for "dserable" read -- desirable --; column 6, line 44, after "radial", second occurrence, insert -- bearing --.

Signed and sealed this 31st day of March 1964.

(SEAL)
Attest:
ERNEST W. SWIDER                                      EDWARD J. BRENNER Attesting Officer                                          Commissioner of Patents